United States Patent
Colletti

[15] 3,707,167
[45] Dec. 26, 1972

[54] HYDRAULIC CONTROLLER INCLUDING ROTARY VALVE

[72] Inventor: John B. Colletti, Grosse Pointe Park, Mich.
[73] Assignee: TRW Inc., Cleveland, Ohio
[22] Filed: June 25, 1970
[21] Appl. No.: 49,708

[52] U.S. Cl...................137/625.24, 91/375
[51] Int. Cl..........................F15b 9/10, F16k 11/12
[58] Field of Search.......137/625.24, 625.21, 625.22; 74/498, 422; 91/375 A; 92/136

[56] References Cited

UNITED STATES PATENTS

| | | | |
|---|---|---|---|
| 3,404,704 | 10/1968 | Adams | 137/625.22 |
| 3,433,127 | 3/1969 | Thompson | 91/375 X |
| 3,296,940 | 1/1967 | Eddy et al. | 91/375 |
| 3,525,362 | 8/1970 | Briggs | 137/625.24 |
| 2,681,581 | 6/1954 | Pearson | 92/136 X |
| 3,145,626 | 8/1964 | Vickers et al. | 137/625.24 X |

Primary Examiner—M. Cary Nelson
Assistant Examiner—Robert J. Miller
Attorney—Hill, Sherman, Meroni, Gross & Simpson

[57] ABSTRACT

A hydraulic controller, for power assist steering or the like systems, which controls the flow of pressurized fluid between a main power fluid pump and a servomotor such as a hydraulic cylinder. The controller includes a rotary valve assembly which confines the fluid within the controller to a valve chamber, enabling the controller to be utilized in remote or integral power steering applications such as rack and pinion gear system without admixing the lighter servomotor operating oil from the heavier gear lubricating oil.

4 Claims, 15 Drawing Figures

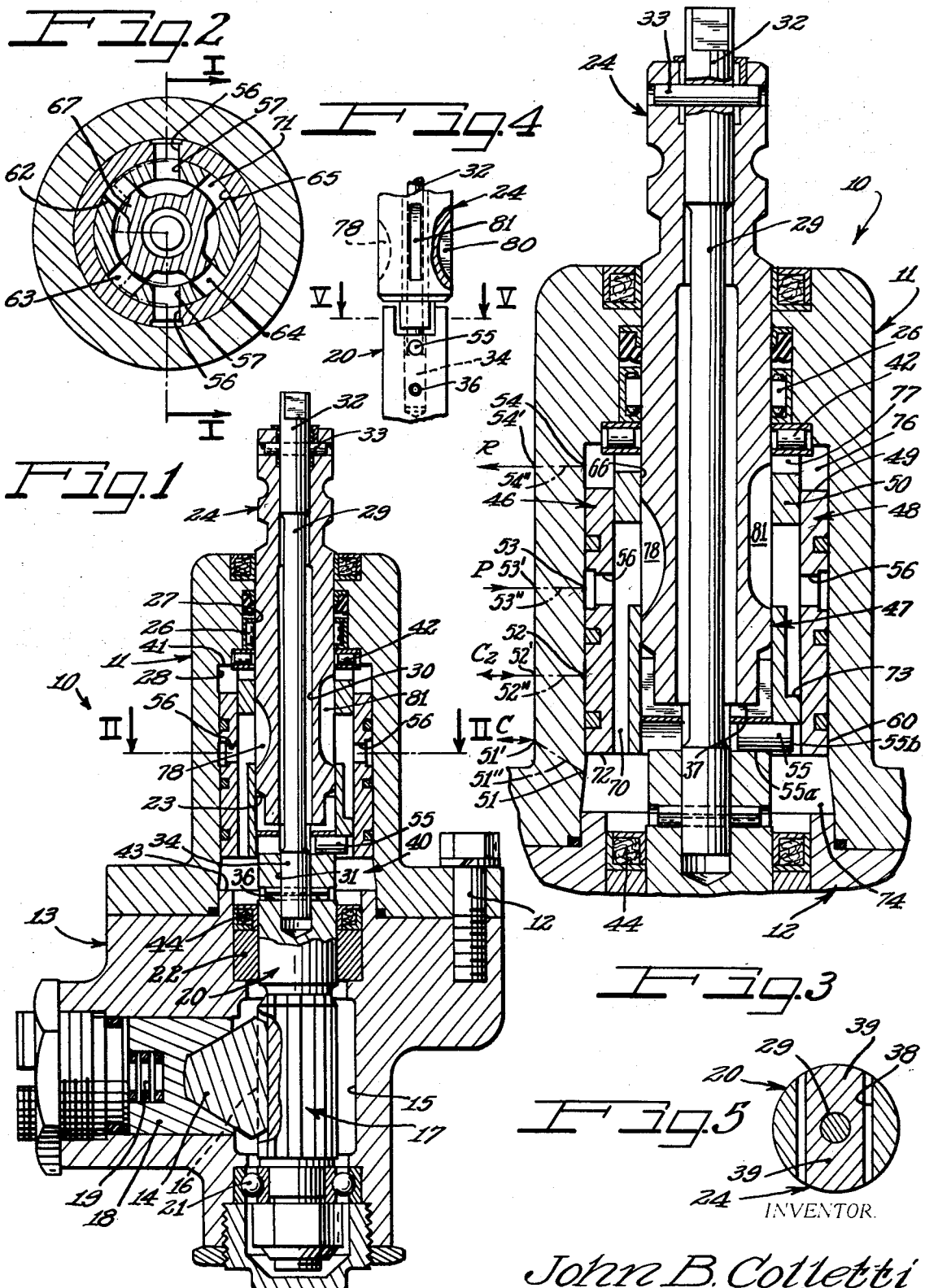

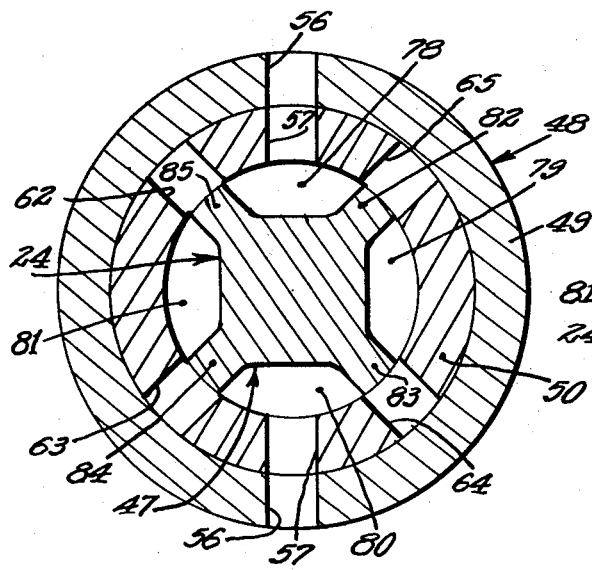
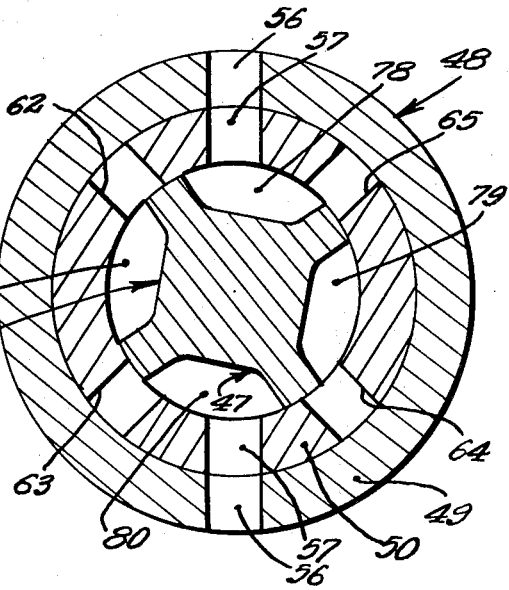
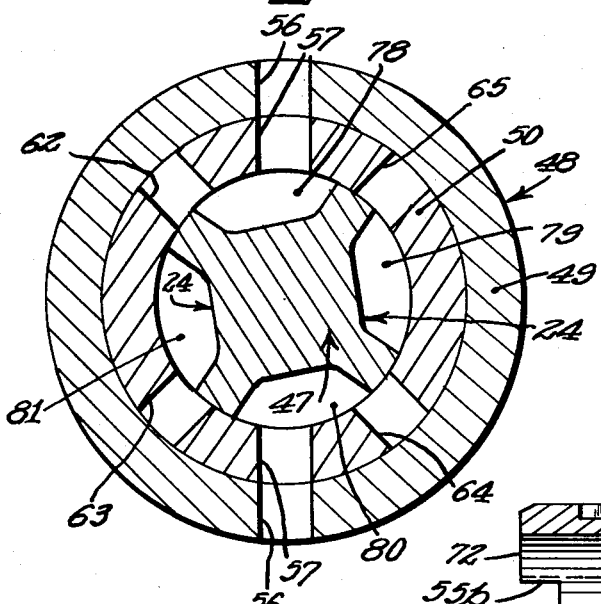
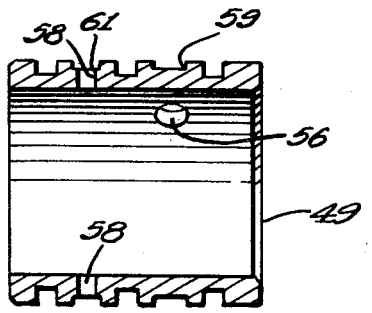
INVENTOR
John B. Colletti
BY [signature] ATTORNEYS

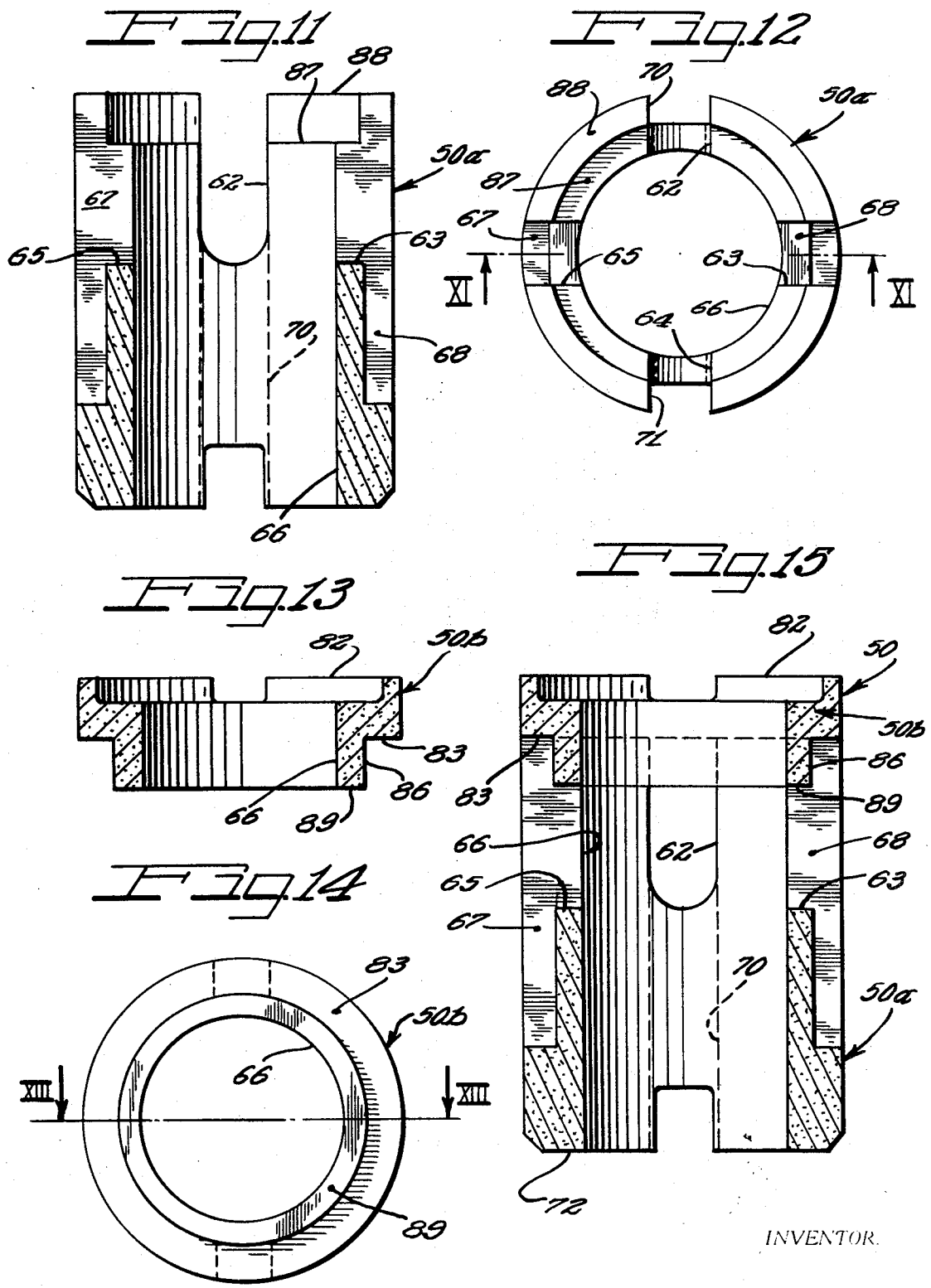

HYDRAULIC CONTROLLER INCLUDING ROTARY VALVE

BACKGROUND OF THE INVENTION

This invention relates generally to the field of servo controllers and more particularly to hydraulic controllers adapted to control the flow of operating fluid between a main power fluid pump and a servomotor such as a hydraulic power cylinder of a vehicular power assist steering system.

There are a variety of vehicular power assist steering systems known in the prior art. Some systems are regarded as being purely hydraulic since there is no direct mechanical connection between the steering column and the steered wheels, even during manual operation as may be occasioned by inoperativeness of the main power fluid pump.

Other systems make provision for a direct mechanical drive connection during manual operation. The present invention, when considered within the context of vehicular power steering systems, is susceptible of utilization in either type of system. As described herein, however, the invention is embodied within the latter type of system, i.e., one in which there exists a direct driving relationship between the steering column and the steered wheel during manual operation. The specific steering system illustrated herein is generally denominated as a rack and pinion gear steering system.

Power assist steering systems known heretofore generally include a hydraulic controller for controlling the flow of operating fluid between the main power pump and the power cylinder. The controllers include valving arrangements generally responsive by one means or another to relative movement of the steering column and the steered wheels. Such relative movement is in some cases the prime signal to which the valving arrangement responds, whereas in other systems the primary signal is a variation in torque applied to the steering column. Some valving arrangements are constructed so as to perform their valving function while rotating in a valve chamber while others are primarily of the axially shifting type.

The present invention relates to a hydraulic controller which utilizes a valving arrangement of the rotary type. In conformance with usual practice, the valve arrangement comprises a pair of valving members which are relatively rotatable alternatively in opposite directions from a mutually neutral position to a pair of operating positions. One of the valve members is connected for joint rotation to a work input shaft (such as a steering column) while the other is connected for joint rotation to a work output shaft movable in response to movement of the steered wheels (such as the pinion gear shaft of a rack and pinion gear system).

In the past hydraulic controllers of the rotary valve type have been generally designed respectively for use with specific power systems. In many instances it is either impossible or impractical to substitute a hydraulic controller of one system for that of another, since generally the design criteria is based solely on the requirements of a single system.

Furthermore, the valve members of known systems have been relatively difficult to manufacture due to the often complicated porting and fluid passage arrangements which are necessarily designed into the valve members.

The problems of lack of interchangeability of hydraulic controllers between various power systems and of relatively high manufacturing costs of rotary valve controllers are among those to which the present invention is particularly directed.

SUMMARY OF THE INVENTION

The present invention may be summarized as comprising a hydraulic controller having a closed valve chamber formed in a housing, a work input shaft and a work output shaft mounted for relative rotation on the housing, a valve assembly in said valve chamber having a pair of valve members connected respectively to the input and output shafts for joint rotation therewith and a plurality of ports including a fluid input port, a fluid output port and a pair of cylinder ports all communicating with the closed valve chamber.

The valve members are so constructed and arranged to control the flow of operating fluid between the inlet port, the outlet port and the cylinder ports as a function of their relative rotational positioning. The output shaft may be connected for joint movement with the servomotor to provide follow-up movements to the valve members as will be understood by those skilled in the art. Since all of the ports communicate with a closed valve chamber the servomotor operating oil, irrespective of whether the controller is remotely or integrally mounted with respect to the steering gear, is maintained in a closed circuit completely separated from the heavier oil which may be used for lubrication purposes in other portions of the steering gear.

One of the valve members comprises two separate tubularly shaped sleeve valve elements telescopically press-fitted one within the other. Before assembly the valve elements are machined to provide certain ports and passages therein but the machining operations are substantially simplified as a consequence of the two-part construction.

Another salient feature of the invention involves the provision of a needle thrust bearing in the controller housing adjacent the valve chamber for accommodating the axial loads of the input shaft, the terminus of which resides within the valve chamber.

Included among the many objects of the invention is the provision of a hydraulic controller having increased application capability, being susceptible of more economic manufacturing techniques, being capable of utilization in manual systems with minimum difficulty, being adapted for remote and integral construction and being capable of fast response and having otherwise good performance characteristics.

Many other features, advantages and additional objects of the present invention will become manifest to those skilled in the art upon making reference to the detailed description which follows and the accompanying sheets of drawings, in which a preferred structural embodiment incorporating the principles of the present invention is shown by way of illustrative example only.

BRIEF DESCRIPTION OF THE DRAWING

FIG. 1 is a sectional view of a hydraulic controller constructed in accordance with the principles of the present invention and mounted on the gear housing of a rack and pinion steering gear, the valve assembly being shown in an irregular section taken substantially along line I—I of FIG. 2.

FIG. 2 is a sectional view taken along lines II—II of FIG. 1.

FIG. 3 is an enlarged portion of FIG. 1.

FIG. 4 is an elevational view of the adjacent ends of the work input and work output shafts of the invention.

FIG. 5 is a sectional view taken along lines V—V of FIG. 4.

FIGS. 6 and 7 are sectional views of two valve elements of the invention, the valve element shown in FIG. 6 being telescopically press-fitted into that shown in FIG. 7 in the assembled state thereof.

FIG. 8 is similar to FIG. 2 and shows the valve assembly in a neutral position.

FIGS. 9 and 10 are similar to FIG. 8 but disclose the relative disposition of the parts when the valve assembly is arranged in two operating positions respectively.

FIGS. 11–14 are sectional views and end views of two pieces of another embodiment of a valve element of the invention, which two pieces are formed of powdered metal.

FIG. 15 is a sectional view of the valve element formed by the two pieces shown in FIGS. 11–14 after being press-fitted together.

DESCRIPTION OF THE PREFERRED EMBODIMENT

While the principles of the present invention are of utility in any hydraulic controller adopted to control the operation of servomotors such as the power cylinders of vehicular power assisted steering system, they are of particular utility when employed in rack and pinion gear power steering systems.

The embodiment of the invention illustrated herein comprises the controller of a rack and pinion gear steering system of which FIG. 1 illustrates a sectional view through a portion thereof indicated generally at reference numeral 10. The structure 10 comprises an apparatus housing including a housing part 11 connected in fixed assembly by means of a plurality of suitable fasteners as indicated by the threaded bolt at reference numeral 12, for example, to a second housing part indicated generally at reference numeral 13. Merely for purposes of convenience the housing part 11 may be referred to as the valve housing whereas the housing part 13 may be referred to as the gear housing.

Located within the gear housing 13 is a rack 14 shown in transverse cross section. The rack 14 is toothed at 16 to mesh with a pinion gear 17, disposed in a gear chamber 15, as will be understood by those skilled in the art. In order to prevent longitudinal twisting of the rack 14 and to provide a suitable backup support, a bearing block 18 biased by means of an adjustable spring 19 is urged into snug bearing relation with the rack 14, complemental V-shaped surfaces being formed on the rack and the bearing block for that purpose.

The pinion gear 17, in the illustrated embodiment of the invention, forms an integral portion of a shaft 20, referred to hereinafter as work output shaft. The shaft 20 is journalled for rotation within the gear housing 13 by means of bearing members 21 and 22 and terminates at an end wall 23 situated within the confines of the valve housing 11.

Axially aligned with the work output shaft 20 is a work input shaft indicated generally at reference numeral 24. The shaft 24 may have mounted directly thereon a steering lever such as a conventional steering wheel or may be coupled for joint rotation to one end of a steering column, the opposite end of which receives the steering wheel. In any event the work input shaft 24 comprises the member to which the steering torque is imparted by the operator of the vehicle and steering movement of the steered wheels follows as an ultimate consequence of rotation of the work input shaft 24.

The shaft 24 is journalled for rotation in the valve housing 11 by means of a roller bearing 26 disposed within an axial bore 27 formed in the housing 11 and opening to an enlarged diameter valve chamber bounded circumferentially by a cylindrical valve chamber wall 28.

As will be described more fully hereinafter the work input shaft 20 and the work output shaft 24 are coupled together for limited relative rotation. In addition to that coupling arrangement, however, the two shafts 20 and 24 are interconnected by means of a slender torsion rod 29 which is disposed within an axial bore 30 formed in the work input shaft 24 and within an axial bore 31 formed in the work output shaft 20. One end of the rod indicated at 32 is connected fast to the work input shaft 24 for joint rotation therewith by means of a transverse pin 33. An opposite end 34 is connected by a similar pin arrangement 36 for joint rotation with the work output shaft 20.

As a consequence of the torsion rod 29 the work input shaft can be rotated relative to the work output shaft 20 but in doing so must overcome a torque resisting such relative rotation as applied by the torsion rod 29. The resilient torsional effect of the rod 29 produces a certain "feel of the road" for the operator of the vehicle and also produces a centering effect on the controller valve assembly, as will become clear hereinafter.

As shown in FIGS. 3 and 4, the distal end wall 23 of the work output shaft 20 axially overlaps an inner end wall 37 of the work input shaft 24. The shaft 20 is transversely slotted as indicated at 38, which slot receives a mating projection 39 of the work input shaft 24. The width of the slot 38 in a direction transverse to the axes of the shafts 20 and 24 is greater than the corresponding dimension of the projection 39 such that the shafts 20 and 24 may rotate relative to one another through a predetermined arc. Thereafter, however, the projection 39 is brought into abutting engagement with the walls of the slot 38 and shafts 20 and 24 rotate jointly. Because of this driving relation the coupling which includes the slot 38 and the projection 39 may be conveniently referred to as a limited relative rotational shaft coupling.

The cylindrical valve chamber wall 28 comprises the peripheral wall of the valve chamber indicated generally at reference numeral 40. The chamber 40 is completely closed and is, with the exception of the ports hereinafter described, substantially fluid sealed. Comprising one radial end wall of the chamber 40 is a wall 41 formed in the valve housing 11 and a needle thrust bearing 42 which circumferentially surrounds the work input shaft 24.

An opposite radial end wall of the chamber 40 is indicated at reference numeral 43 in the gear housing 13, and a seal 44 circumferentially surrounds the work output shaft 20 and is disposed axially adjacent the bearing member 22.

Referring particularly to FIGS. 3, 6 and 7 a valve assembly indicated generally at reference numeral 46, is disposed within the valve chamber 40. Essentially, the valve assembly 46 is of the rotary type and comprises a pair of relatively rotatable valve members, one of which is indicated at reference numeral 47 and comprises an inner portion of the work input shaft 24, and the other of which is indicated generally at reference numeral 48 and comprises a pair of tubularly shaped valve elements indicated respectively at reference numerals 49 and 50.

The outside diameter of valve element 49 is substantially the same as the diameter of the valve chamber 40, while the inside diameter of the valve element 50 corresponds substantially to the outside diameter of the work input shaft 24.

On the other hand, the inside diameter of valve element 49 is slightly less than the outside diameter of element 50 so that, after the elements 49 and 50 are machined, element 50 is telescopically press-fitted into element 49 and thereafter the two elements comprise, in effect, a single valve member 49.

Communicating with the valve chamber 40 are four ports indicated respectively at reference numerals 51, 52, 53 and 54. Ports 51 and 52 may be conveniently referred to as cylinder ports, port 53 may be denominated a fluid inlet port and port 54 a fluid outlet or return port. Ports 51–54 communicate with corresponding conduit connections 51'–54' through internal passages 51"–54" formed in the valve or controller housing 11. Ports 51 and 52 are connected to the opposite ends of a double-acting servomotor or power cylinder which, in turn, is operatively connected to the rack 14 for providing a power assist to the movement of the rack and consequently to the turning of the steered wheels. Port 53 is connected to a suitable source of pressurized fluid such as a main power fluid pump mounted on the vehicle and port 54 is connected to the return or low pressure side of the main power pump.

The valve assembly 46 controls the flow of operating fluid between ports 51–54 as a function of the relative rotational positioning of valve members 47 and 48. To perform this function the valve members are ported and passaged in the following manner.

The outer valve element 49 has a pair of radial bores 56,56 which register with corresponding bores 57,57 formed in the inner valve element 50. Angularly offset slightly from bores 56 are a pair of bores 58,58 formed in the outer valve element 49. The bores 56 communicate with a land 59 arranged in circumferentially continuous relation about an outer peripheral wall 60 of the outer valve element 49. Another circumferential land 61 is spaced from land 59 and it will be appreciated from FIG. 6 that land 59 constantly communicates bore 56 with the fluid inlet port 53 and land 61 constantly communicates bore 58 with the cylinder port 52.

The inner valve element 50 comprises four ports 62–65 opening through an inner wall 66 to the valve member 47. Ports 62 and 64 communicate respectively with axially extending slots 67 and 68 formed in an outer peripheral wall 69 and ports 63 and 65 communicate respectively with axial slots 70 and 71 also formed in the peripheral wall 69. Slots 70 and 71 open to an end wall 72 of the valve member 48 whereas slots 67 and 68 terminate at radial walls 73,73 short of the end wall 72. That portion of the valve chamber 40 between the end wall 72 of the valve assembly 48 and the radial wall 43 of the gear housing 13 comprises a valve chamber portion 74 which communicates only with the cylinder port 51. Another portion 76 of the valve chamber 40 which resides between an end wall 77 of the valve assembly 48 and the radial wall 41 of the housing 11 communicates only with the fluid outlet or return port 54.

The valve portion 47 of the input shaft 24 is provided with a series of valving passages to complement those of the valve assembly 48 in the performance of the total valving function. Thus there is formed in shaft portion 47 a series of longitudinally extending slots 78–81 formed in the peripheral wall 27 of the input shaft 24. The slots 78–81 are disposed along the axis of shaft 24 so as to be generally in axial alignment with bores 57 and 62–65 of the inner valve element 50. Slots 78 and 80 reside completely between the end walls 72 and 74 of the valve assembly 48, whereas slots 79 and 81, while not opening to the end wall 72, do extend through the end wall 77 and are in open communication with the outlet port 54 through portion 76 of the valve chamber 40. A series of lands 82–85 separate the slots 78–81. As seen in FIG. 8, the circumferential dimension of lands 82–85 is slightly less than the circumferential extent of bores 62–65 so that, for example, in the relative position of the parts shown in FIG. 8, slot 78 communicates with slot 79 through the bore 65.

In operation of the device 10 either of two general conditions may obtain. Either a torque is being applied to the input or operating shaft 24 for the purpose of turning the steered wheels or it is not.

When the input shaft 24 is not subjected to an operating torque the various valve parts assume the relative positions thereof shown in FIG. 8. These positions are assumed by virtue of the centering bias of the torsion rod 29 which, in an unstrained condition, maintains the input shaft 24 in a predetermined relative rotational position with respect to the output shaft 20.

In such position of the valve parts high pressure fluid entering the housing 11 through fluid inlet port 53 is conducted through the pairs of bores 56 and 57 and then into the slot 78 and 80 formed in the input shaft 24. Since all of the bores 62–65 are in open communication with each other, the fluid merely passes through the slots 79 and 81 into the valve chamber portion 76 and thence through the fluid outlet port 54 to the return or low pressure side of the main power fluid pump.

Although the ports 62 and 64 are in open communication with cylinder port 51, and ports 63 and 65 are in open communication with cylinder port 52, it is apparent that the pressure at both ports 51 and 52 is essentially identical and thus the entire high pressure fluid is merely conducted through the housing 11 from fluid inlet port 53 to fluid outlet port 54.

Assume that the operator of the vehicle on which the system 10 is mounted now imparts a torque to the input shaft 24 to rotate it in a rightward direction as shown in FIG. 9. The valve parts 47 and 48 are then relatively rotated in a manner so that the high pressure fluid is conducted from port 53 through bores 56 and 57 into the slot 78 and 80 but now such slots do not communicate with bores 62 and 64, but instead communicate only with bores 63 and 65. Thus, the high pressure fluid is conducted through passages 67 and 68 to the bores 58,58, and thence to the cylinder port 52 formed in the housing 11.

The end of the servomotor or power cylinder connected to port 52 is thereby pressurized, thus causing movement of the rack 14 to which the movable member or piston rod of the power cylinder is attached. The fluid from the opposite end of the power cylinder is conducted to cylinder port 51 and into valve chamber portion 74. Passages 66 and 70 communicate with valve chamber portion 74 to conduct the fluid therein through ports 62 and 64 and thence into slot 79 and 81 of the input shaft 24, from which the fluid passes into valve chamber portion 76 and thence to the return or fluid outlet port 54. So long as torque is imparted to the input shaft 24 tending to rotate it in a clockwise direction, the valve portion 47 of the shaft 24 will maintain the same relative position to the valve assembly 48 as that shown in FIG. 9 and the high pressure fluid will continue to be conducted to cylinder port 52, tending to cause movement of the rack 14 in a direction so as to rotate the output shaft 20. The shaft 20 is coupled for joint rotation to the valve assembly 48 by means of a locking pin 55 press fit into a pair of registered bores 55a and 55b formed respectively in the output shaft 20 and the valve assembly 48. Thus as the output shaft 20 is rotated by the rack 14 and the pinion gear 17, so also is the valve assembly 48, in the same direction of rotation as the input shaft 24. Therefore, so long as the input shaft 24 is rotated in a clockwise direction, the valve assembly 48 will also rotate in a clockwise direction, but will lag the input shaft 24 by an angle substantially as shown in FIG. 9.

When the rotational torque is released from the operating shaft 24 the high pressure fluid will continue to flow from the cylinder port 52 to the corresponding end of the power cylinder so long as the lands 82–85 continue to partially close ports 62–65. However, after rotation of the output shaft 20, and thus the valve assembly 48, continues and rotation of the input shaft 24 ceases, the valve assembly 48 will eventually assume the same relative position to valve portion 47 of the input shaft 24 as is shown in FIG. 8. When this condition obtains, the high pressure fluid will again pass from the fluid inlet port 53 to the fluid outlet port 54 substantially directly through the housing 11 and the turning effect imparted to the steered wheels will cease.

If the operating shaft 24 is rotated in a counterclockwise direction the valve parts will assume the relative disposition thereof shown in FIG. 10. In that position of the valve members 47 and 48 the high pressure fluid flows from the fluid inlet port 53, then through passages 56 and 57 into slots 78 and 80. These two slots now communicate, however, with ports 62 and 64, rather than ports 63 and 65, and thus the high pressure fluid now flows through the passages 66 and 70 to the valve chamber portion 74. From there the high pressure fluid flows out of the cylinder port 51 to its corresponding end of the power cylinder and thereby has the effect of turning the steered wheels in a direction opposite to the direction in which they were turned when the valve members 47 and 48 were in the relative position thereof shown in FIG. 9.

The fluid returning from the opposite end of the power cylinder flows through cylinder port 52 and thence into passages 67 and 68, from which it flows through ports 63 and 65 and into slots 79 and 81 of the input shaft 24. From slots 79 and 81 the return fluid flows into valve chamber portion 76 and thence back to the main power fluid pump through the fluid outlet port 54.

Once again, the operation of the power cylinder has the effect of moving the rack 14 in a manner such that the output shaft 20, and thus the valve assembly 48, which is coupled to the shaft 20 by means of the locking pin 55 for joint rotation, is rotated in the same direction as is the input shaft 24, but lags the rotation of shaft 24 by a predetermined angle as is shown in FIG. 10. When the operator of the vehicle stops rotating the input shaft 24, the output shaft 20 will continue to rotate until the valve parts 47 and 48 are so disposed as to communicate the fluid inlet port 53 substantially directly with the output port 54. The centering bias of the torsion rod 29 then rotates the valve parts 47 and 48 back to the neutral position thereof shown in FIG. 8.

Generally, the oil utilized in the fluid operating circuit is lighter than the gear lubricating oil. For example, the oil circulated by the main power fluid pump through the housing 11 to operate the power cylinder is lighter than the oil which is packed within the gear housing 13 to lubricate the rack 14 and pinion gear 17. By virtue of the present invention the lighter operating oil is completely separated from the rack and the pinion gear and thus mixing of the lighter and heavier oils is avoided.

Reverting to the valve arrangement, the purpose of the needle thrust bearing 42 is to absorb the thrust load of the valve sleeve assembly 48. Thus, when the input shaft 24 is rotated leftwardly to the position shown in FIG. 10, the pressure in chamber portion 74 exceeds the pressure in chamber portion 76 and the valve assembly 48 is subjected to an axial load which is accommodated by the bearing 42. The same pressure differential also acts against the inner end wall 37 of the input shaft 24, but this load is supported by the work input shaft 20 through the torsion rod 29 through pins 33 and 36.

In connection with the support bearing arrangement for the input shaft 24, the bearing 26 comprises one support but a second support is provided by the valve assembly 48. Thus the close fit between the inner diameter of the valve element 50 and the outer diameter of the valve portion or working area 47 of the input shaft 24 (which close fit is an indispensable requisite to hydraulic operability of the device) confers upon the valve assembly 48 the ability to provide the input shaft 24 with a bearing support, in addition to that provided by bearing 26, without sacrificing compactness and simplicity in design.

Furthermore, the configuration of the valve elements 49 and 50 which, when press-fitted together serve as a completely unitary valve member 48, enables such parts to be economically formed since all of the ports and passages of both elements open to either the inner or outer peripheral walls or to the end walls of the individual elements in their disassembled condition. Consequently, difficult machining of longitudinal flow passages between the peripheral walls of the valve assembly 48 is avoided.

According to the principles of the present invention the necessity for any machining whatsoever of the valve element 50 can be entirely eliminated while the bearing qualities are enhanced by forming the valve element 50 of powdered iron in a powdered metal fabrication process. In order to provide configurative relationships susceptible to such fabrication methods the valve element 50 may, as shown in FIGS. 11–14, be formed of two separate pieces identified respectively at reference characters 50a and 50b, which are press-fitted together after fabrication to comprise a single valve element 50.

Slots 67, 68, 70 and 71 are disposed entirely between end walls 72 and 82 of the valve element 50 and one end 83 thereof is formed by radial walls 83 and 84 which are interconnected by a reduced diameter peripheral wall 86 which forms a collar for the valve piece 50b.

Valve piece 50a comprises cooperating radial walls 87 and 88 and a cylindrical wall 89. After the two valve pieces 50a and 50b are fabricated the collar 86 of the valve piece 50b is inserted in press-fitted relation into the cylindrical wall 89 of the valve piece 50a to form a single unitary valve element 50. After the valve member 50 is press-fit into the valve member 49 the radial bores 56 and 57 are drilled simultaneously to avoid problems of misalignment.

Although minor modifications might be suggested by those versed in the art, it should be understood that I wish to embody within the scope of the patent warranted hereon all such modifications as reasonably come within the scope of my contribution to the art.

What I claim is:

1. A hydraulic controller comprising a housing, means including a cylindrical wall and a pair of spaced end walls forming a closed valve chamber in said housing, a work input shaft and a work output shaft mounted for relative rotation on said housing, a fluid inlet port, a fluid outlet port and a pair of fluid cylinder ports formed in said cylindrical wall between the axial confines of said end walls, and valve means in said valve chamber including first and second valve members connected for joint rotation to said work input and output shafts, respectively, for controlling the flow of fluid between said ports as a function of the relative rotational positioning of said shafts, said second valve member comprising a sleeve valve assembly having an outer cylindrical wall in sliding engagement with said cylindrical wall of said valve chamber, said sleeve valve assembly comprising a pair of tubular elements press-fitted together in telescopic relation and having means forming fluid flow openings in the mating faces thereof.

2. A hydraulic controller comprising a housing, means including a cylindrical wall and a pair of spaced end walls forming a closed valve chamber in said housing, a work input shaft and a work output shaft mounted for relative rotation on said housing, a fluid inlet port, a fluid outlet port and a pair of fluid cylinder ports formed in said cylindrical wall between the axial confines of said end walls, and valve means in said valve chamber including first and second valve members connected for joint rotation to said work input and output shafts, respectively, for controlling the flow of fluid between said ports as a function of the relative rotational positioning of said shafts, said second valve member comprising a sleeve valve assembly having an outer cylindrical wall in sliding engagement with said valve chamber cylindrical wall and a pair of axially spaced end walls, one of said end walls of said sleeve valve assembly being spaced axially from the adjacent one of said valve chamber end walls, one of said ports being disposed axially between said adjacent ones of said end walls of said valve chamber and said sleeve valve assembly, said sleeve valve assembly being tubularly shaped and comprising means forming a fluid flow passage between the inner peripheral walls thereof and said one of the end walls thereof.

3. A hydraulic controller comprising a housing, means including a cylindrical wall and a pair of spaced end walls forming a closed valve chamber in said housing, a work input shaft and a work output shaft mounted for relative rotation on said housing, a fluid inlet port, a fluid outlet port and a pair of fluid cylinder ports formed in said cylindrical wall, and valve means in said valve chamber including first and second valve members connected respectively to said work input shaft and said work output shaft for joint rotation therewith and for controlling the flow of fluid between said ports as a function of the relative rotational positioning of said shaft, said second valve member comprising a sleeve valve assembly having an outer cylindrical wall in sliding engagement with said valve chamber cylindrical wall and a pair of axially spaced end walls, one of said end walls of said sleeve valve assembly being spaced axially from the adjacent one of said valve chamber end walls, said sleeve valve assembly being tubularly shaped and comprising means forming a fluid flow passage between the inner peripheral wall thereof and said one of the end walls thereof.

4. A hydraulic controller comprising a housing, means including a cylindrical wall forming a valve chamber in said housing, a work input shaft and a work output shaft mounted for relative rotation on said housing, a fluid inlet port, a fluid outlet port and a pair of fluid cylinder ports formed in said cylindrical wall, and valve means in said valve chamber including first and second valve members connected for joint rotation to said work input shaft and said work output shaft, respectively, for controlling the flow of fluid between said ports as a function of the relative rotational positioning of said shafts, said second valve member comprising a generally
cylindrical valve assembly having an outer cylindrical wall in sliding engagement with said cylindrical wall of said valve chamber,
said valve assembly comprising a pair of tubular elements one of which is press-fitted within the other in telescopic relation, and means forming fluid flow openings in the mating faces of said tubular elements.

* * * * *